United States Patent Office 2,924,501
Patented Feb. 9, 1960

2,924,501

WET-SPINNING OF POLYESTER FIBERS

William S. Wagner and William A. H. Huffman, Decatur, Ala., assignors to The Chemstrand Corporation, Decatur, Ala., a corporation of Delaware No Drawing. Application October 22, 1956
Serial No. 617,245

12 Claims. (Cl. 18—54)

This invention relates to the production of filaments and fibers from polymers which are polyesters and copolyesters and modified polyesters and copolyesters by the wet-spinning method. More particularly, this invention is concerned with a process employing new and novel baths for the coagulation of spinning solutions of such polymers in phenolic solvents.

The simplest form of polymer containing ester linkages is the polyester and it is well known that linear polyesters can be made by heating together a dihydric alcohol or its functional derivatives and a dibasic carboxylic acid or a polyester-forming derivative thereof, such as an acid halide, a salt, or a simple ester of a dibasic acid and volatile monohydric alcohol. As heating is continued, particularly in vacuum and/or in a current of an inert gas, condensation continues linearly with formation of longer and longer chains. When these polyesters are in a highly polymerized condition, they can be formed into filaments, fibers and the like, which can be permanently oriented by cold drawing. That is, when the esterification reaction is carried out for a sufficiently prolonged period under conditions such as to remove the volatile products effectively, linear polyesters may be produced having extremely high molecular weights, which, in the case of polyesters capable of crystallizing at ordinary temperature, may possess the property of cold drawing. The crystalline polyesters are hard, tough microcrystalline substances which melt at a definite melting point to form viscous liquids.

The most widely known and most important commercially of the highly polymeric polyesters is that prepared by condensation of terephthalic acid or dimethyl terephthalate and a polymethylene glycol containing from two to ten carbon atoms, and particularly ethylene glycol. These polyesters are relatively insoluble, chemically inactive hydrophobic materials capable of being formed into filaments which can be cold-drawn to produce textile filaments and fibers of superior strength and pliability. Because of the relative insolubility in most solvents of these polyesters it has been thought in the past that methods of melt-spinning were the only practical methods to employ in producing filaments and fibers therefrom. In fact, at present the only method employed commercially for converting these polyesters into filaments, fibers, and the like is that of melt-spinning.

The wet-spinning method in which a solution of polyesters is extruded into a bath containing a non-solvent for the polyester has a number of advantages over the melt-spinning method. For example, the wet-spinning method is generally more economical and can be carried out at lower temperatures. Therefore, plasticizers and other agents may be added with a minimum tendency toward discoloration and decomposition. Furthermore, certain types of plasticizers and modifying agents tend to be less compatible for blending in a melt at high temperatures, whereas they can be readily incorporated in a polyester solution at a low temperature.

There is a scarcity of suitable solvents for the more usual types of polyesters. It has been known that most polyesters were soluble at least at high temperatures in strong, more or less corrosive phenolic solvents such as meta-cresol, the mixed cresols, phenol and the like. However, these findings alone have not enabled a commercial wet-spinning process for polyesters to be developed.

An important factor in the commercial success of a wet-spinning process for producing polyester filaments and fibers is the selection of the coagulating bath. A highly advantageous coagulating bath would be one which could satisfy, among others the following conditions: (A) a bath made with low cost coagulating components; (B) a bath which could be continuously regenerated with facility and high efficiency, particularly as to the recovery and recycling of the solvent component therein for reuse in making the spinning solution; and (C) a bath capable of successful and continuous spinning and of producing suitable fibers under normal type wet-spinning operating conditions.

The coagulating media for polyesters proposed by the prior art have been water or such a non-solvent as xylene. However, neither of these media has proved successful for filament formation. Water as a precipitant for phenolic solutions of polyesters is far too slow to be of practical use. Water, hot or cold, requires such a long time to extract the phenolic solvents from the extruded stream of polyester solution that support for the extruded stream is required to prevent it from losing shape and forming a pool. The use of xylene as a precipitating or coagulating agent for polyester solutions in phenolic solvents is likewise very impractical. Upon contact with a coagulating bath of xylene an extruded stream of a phenolic solution of polyesters is coagulated and immediately breaks up into minute particles, almost a powder, and showers to the bottom of the coagulating vessel.

The object of this invention is the provision of a wet-spinning method for producing shaped articles, and specifically filaments and fibers, from phenolic solutions of ester polymers or polyesters and copolyesters and modified polyesters and copolyesters. A further object is the provision of a wet-spinning process for phenolic solutions of polyesters which employs new and novel coagulating baths in the system. A still further object is provision of such new and novel coagulating baths comprising readily available, economical materials. A still further object is the provision of such coagulating baths which are easily recoverable for reuse. Another object is the provision of such coagulating baths which are capable of successful and continuous spinning thereby producing suitable and saleable filaments and fibers. Other objects of the invention will be apparent from the description thereof hereinafter.

In accordance with the present invention synthetic filaments, fibers and other shaped articles are formed from a polymer or polyester by extruding a solution of the polyester in a phenolic solvent therefor into a coagulating medium or bath selected from the group consisting of N,N-dimethylformamide, N,N-dimethylacetamide, and mixtures thereof with water, and thereafter washing the shaped articles thus produced to remove substantially all the solvent and coagulating medium therefrom.

The synthetic linear condensation polymers contemplated in the practice of the instant invention are those formed from dicarboxylic acids or ester-forming derivatives thereof and glycols, and copolyesters thereof. Also included are the modified polyesters and copolyesters in which the structure has been modified by the inclusion of certain specified chemical reactants during the polymerization thereof. The ester-forming derivatives of dicarboxylic acids most generally employed commercially are the dialkyl esters, and the term "ester-forming derivatives of dicarboxylic acids" is specifically deemed to embrace these ester derivatives. The polyesters and copolyesters useful in the instant invention are those produced by reacting or polymerizing one or more glycols of the formula $$HO-(CH_2)_n-OH$$

in which $n$ is an integer from two to ten, with one or more dicarboxylic acids or ester-forming derivatives thereof. Among the dicarboxylic acids and ester-forming derivatives thereof useful in the present invention are terephthalic acid, sebacic acid, adipic acid, p-carboxyphenoxyacetic acid, succinic acid, p,p'-dicarboxydiphenyl, p-carboxyphenoxyacetic acid, p-carboxyphenoxypropionic acid, p-carboxyphenoxybutyric acid, p,p'-dicarboxydiphenylmethane, p,p'-dicarboxydiphenylethane, p,p'-dicarboxydiphenoxyethane, p,p'-dicarboxydiphenoxypropane, 3-alkyl-4-(beta-hydroxy ethoxy) benzoic acid, oxalic acid, glutaric acid, pimelic acid, suberic acid, azelaic acid and the ethylene di(oxyalkanoic) acids having the general formula $$HOOC-(CH_2)_n-O-CH_2CH_2-O-(CH_2)_n-COOH$$

wherein $n$ is an integer from 1 to 4, such as ethylene bis-(oxyethanoic) acid, ethylene bis(oxybutanoic) acid, and the like, and the aliphatic and cycloaliphatic aryl esters and half esters, ammonium and amine salts, and acid halides of the above acids. Examples of the glycols which may be employed are ethylene glycol, trimethylene glycol, tetramethylene glycol, decamethylene glycol, and the like. Polyethylene terephthalate is the preferred polyester because of the ready availability of terephthalic acid and ethylene glycol.

Among the modified polyesters and copolyesters which are useful in the practice of the instant invention are the polyesters and copolyesters defined above modified with monohydroxyl chain terminating compounds, such as monohydric polyalkylene oxides and polyalkylvinyl ethers having one terminal hydroxyl group. The suitable monohydric polyalkylene oxides are those having the general formula (I)  $$R-O-[(CH_2)_mO]_x(CH_2)_n-OH$$

wherein R is an alkyl group containing 1 to 4 carbon atoms; $m$ and $n$ are integers from 1 to 22, and $x$ is a whole number indicative of the degree of polymerization, i.e. $x$ can be from 1 to 100, or greater. Examples of such compounds are methoxypolyethylene glycol, ethoxypolyethylene glycol, n-propoxypolyethylene glycol, isopropoxypolyethylene glycol, methoxypolypropylene glycol, n-butoxypolyoctadecylene glycol, ethoxypolyeicosylene glycol, and the like. Suitable polyalkylvinyl ethers are the addition polymers prepared by homopolymerization of alkyl vinyl ethers wherein the alkyl group contains from one to four carbon atoms and having one terminal hydroxyl group. Examples of such compounds are polymethylvinyl ether, polypropylvinyl ether, polybutylvinyl ether and the like, having one terminal group. Their modified polyesters and copolyesters can be prepared by the methods set out in the copending application of W. A. H. Huffman, Serial No. 553,433, filed December 16, 1955.

Other medified polyesters and copolyesters useful in the practice of the instant invention are those modified with cross-linking agents together with a chain terminating agent as set out above. Thus, they include polyesters and copolyesters modified with chain terminating compounds having the general Formula I and polyalkylvinyl ethers having one terminal hydroxyl group wherein the alkyl groups contain from 1 to 4 carbon atoms, together with cross-linking agents which are polyfunctional acids and alcohols with a functionality greater than two, or their simple derivatives. The acids and their derivatives are compounds having the general formula (II) 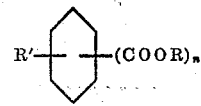

in which R is an alkyl group having 1 to 3 carbon atoms, R' is hydrogen, methyl, or ethyl, and $n$ is an integer from 3 to 5 inclusive. Among such compounds are trimethyl trimesate, tetramethyl mellophonate, trimethyl trimellitate, tetramethyl prehnitate, tripropyl trimesate and ring alkylated esters of benzene tricarboxylic acids. Polyfunctional alcohols or their simple derivatives which may be used as cross-linking agents are the saturated aliphatic or cycloaliphatic polyhydric alcohols containing only C, H, and O, having the general formula (III)  $$R(OH)_n$$

wherein R is a saturated aliphatic or a cycloaliphatic group having from 3 to 6 carbon atoms and $n$ is an integer greater than 2. Examples of such compounds are pentaerythritol, sorbitol, glycerol, mannitol, and the like. These modified polyesters and copolyesters can be prepared by the methods set out in the copending application of W. A. H. Huffman, Serial No. 533,424, filed December 16, 1955, now Pat. No. 2,836,851.

Additional modified polyesters and copolyesters useful in the practice of the present invention are those polyesters and copolyesters defined above modified with long chain aliphatic dicarboxylic acids or the dialkyl esters thereof in which the aliphatic chain contains from 15 to 25 carbon atoms. Such acids and their dialkyl esters have the general formula (IV)  $$R'OOC-(CH_2)_m-CH-(CH_2)_n-COOR'$$
                          $$|$$
                          $$R$$

wherein R and R' are selected from the group consisting of hydrogen and alkyl groups having from 1 to 8 carbon atoms and $m$ and $n$ are integers, including zero, the sum of which is from 12 to 22 inclusive and mixtures of the above acids or dialkyl esters thereof. Thus when $m$ is zero, $n$ must be at least 12 in order that the aliphatic chain contain at least 15 carbon atoms; conversely, when $m$ is 22, $n$ can be only zero in order that the aliphatic chain contain not more than 25 carbon atoms. The R substituent can be located at any point between the carboxyl groups. The alkyl side chain represented by R is preferably methyl or ethyl. The dialkyl esters are preferably those in which the alkyl group represented by R' contains from 1 to 5 carbon atoms. Examples of suitable long chain aliphatic acids include pentadecanedioic acid, octadacanedioic acid, nonadecanedioic acid, eicosanedioic acid, heneicosanedioic acid, docosanedioic acid, 8-ethyl octadecanedioic acid, 9-methyl nonadecanedioic acid, 9-methyl eicosanedioic acid, and mixtures thereof. Examples of suitable dialkyl esters of the long chain aliphatic acids include dimethyl pentadecanedioate, diethyl octadecanedioate, dimethyl nonadecanedioate, dimethyl eicosanedioate, diethyl eicosandedioate, dipropyl eicosanedioate, dimethylheneicosanedioate, dimethyl 9-ethyl-octadecanediote, diethyl 9-methylnonadecanedioate, dimethyl 9-methyleicosanedioate, and the like, and mixtures thereof.

These polyesters and copolyesters modified with long chain aliphatic dicarboxylic acids and dialkyl esters thereof can be prepared in the same manner as the polymethylene glycol-dicarboxylic acid polyesters previously known, employing the same conditions and catalysts, in a two stage reaction. Thus, the long chain aliphatic dicarboxylic acids are added to the original charge of a polymethylene glycol and a suitable dicarboxylic acid and reacted in the presence of a catalyst at elevated temperatures, usually from about 150° to 220° C., and atmospheric pressure to form water and the bis-2-hydroxylalkyl dicarboxylate monomer. Alternatively, the dialkyl esters of the long chain aliphatic dicarboxylic acids are added to the charge of a polymethylene glycol and a dialkyl ester of a suitable dicarboxylic acid and the mixture caused to undergo an ester interchange reaction to produce one or more volatile alcohols and the bis-2-hydroxyalkyl dicarboxylate monomer. Thereafter, in the second stage, the monomer is heated to still higher temperatures, generally from about 260° to 290° C., under reduced pressure and in the presence of the same or a different catalyst to form the modified polyester with elimination of a monomeric polymethylene glycol which is readily volatilized. The second, or polymerization, stage is continued until a polyester having the desired degree of polymerization is obtained. This stage generally requires from about 1 to 6 hours to obtain a sufficiently high degree of polymerization to yield filament-forming polymers.

The solvents useful in the present invention are strongly polar solvents derived from phenols and may be referred to generally as phenolic solvents. The preferable phenolic solvents used herein are phenol, mixtures of phenol with from 1 to 15 percent water, and meta-cresol. Other phenolic solvents which are also suitable for use in the process include mixtures of phenol with from 5 to 15 percent resorcinol, mixtures of phenol with from 5 to 50 percent chloral hydrate, mixtures of phenol with 5 to 15 percent chloral amide, mixtures of phenol with from 5 to 99 percent 2,4,6-trichloro-phenol, 6-tert.-butyl-meta-cresol, resorcinol monomethyl ether, and 2,4,6-trichlorophenol. The maximum solids concentrations of the polyesters that can be obtained in solution and the viscosity of the solution depend upon the nature of the polyester, the solvent or solvent mixture and the temperature. Solutions having polymer concentrations of from about 20 percent to as high as 40 percent can be successfully coagulated into good strength fibers by means of the present invention. It is preferred to employ solutions containing from about 25 to about 35 percent polymer.

The coagulating or setting baths for use in the instant invention may contain water in any amount from a trace up to about 80 percent by volume. Since water has been found to slow the coagulation of polyester solution in dimethylcarboxamides, it is generally preferred to use only up to about 50 percent of water by volume in the baths. The coagulation baths can be used at any convenient temperature ranging from just above the freezing point to the boiling point of the constituents of the bath, and a minimum of experimentation will establish a range of optimum temperatures for any particular polyester, solvent, and spinning solution concentration selected. The temperature can be adjusted to effect a reasonable speed in the coagulation of the articles. Thus, if coagulation is a little too slow at one temperature, it is possible to warm the baths, which speeds up the process of precipitation and setting. Generally, it has been observed that the use of coagulation baths at temperatures greater than about 85° C. results in the production of weaker filaments. Consequently, the preferred temperatures are those from about 5° C. to about 85° C.

The process of this invention may be carried out by extruding the polyester solutions in the normal manner of wet-spinning processes, i.e. by means of a spinneret having one or more apertures in the face thereof which has been immersed in the coagulating or setting bath. This is the preferred method of carrying out the process of this invention. Alternatively, the spinning method known as dry jet-wet spinning may be employed wherein the spinneret is positioned a short distance above the surface of the coagulating or setting bath. The coagulating bath itself may be of any desired length necessary to fully coagulate and precipitate the polyester solution, and may have positioned therein suitable filament guides, rollers, or other supporting members as required. The filament or filaments, as the case may be are moved from the coagulating bath and passed through a washing medium where all the residual solvent and coagulating liquid are removed therefrom. Water is the preferred washing medium and is usually contained in a bath through which the filaments are passed. Washing rolls or like apparatus, such as godets, thread-advancing reels, or bobbins may also be employed. Thereafter the filaments are dried if desired prior to cold-drawing. The oriented filaments can then be cut into short, discontinuous lengths to form staple fibers by any convenient means. The present invention also contemplates the imposition of sufficient tension upon the fibers or other articles in the coagulating or setting baths to elongate the fiber or other article while coagulation is taking place. For this purpose, the conventional winding or take up devices may have their peripheral speed adjusted to any speed greater than the rate of extrusion of the polymer solutions.

The following examples will serve to further illustrate the process of the present invention. The invention is not, however, limited to the specific embodiments shown in the examples, but is limited only by the scope of the appended claims.

Example I

A solution was prepared containing 30 percent by weight of a modified polyethylene terephthalate in a solvent consisting of 93 parts of phenol and 7 parts of water by weight. The polymer was prepared from ethylene glycol, dimethyl terephthalate, and a mixture composed of approximately 57 percent of the dimethyl ester of eicosane-1,20-dioic acid and approximately 43 percent of the dimethyl ester of 8-ethyleicosane-1,18-dioic acid and in which 20 percent of the total diesters charged were the long chain aliphatic diesters. A slurry of the ground polymer mixed with the phenol-water solvent was heated to approximately 90° C., until solution was complete, filtered and cooled to room temperature, approximately 30° C. The clear, pourable solution was flowed onto a glass plate at room temperature, smoothed to a thin layer and coagulated by immersing the plate and solution in a coagulating bath of N,N-dimethylacetamide. This treatment resulted in the immediate coagulation of the solution to an opaque film, which when washed and separated from the plate was found to be extremely flexible and tough. The film was capable of being cold-drawn to a strong, flexible film suitable for packaging and laminating purposes.

Example II

A solution containing 30 percent by weight of the same modified polyethylene terephthalate polymer described in Example I above was prepared by heating a slurry of the ground polymer in a solvent consisting of 93 parts of phenol and 7 parts of water to a temperature of approximately 95° C. until solution was complete. The resulting solution was filtered and cooled to room temperature, approximately 30° C. The clear, pourable solution was flowed onto a glass plate, smoothed to a thin layer, and coagulated by immersing the plate and solution in a coagulating bath of 50 percent N,N-dimethylacetamide and 50 percent water by volume at room temperature. The coagulation of the solution to a very tough film occurred immediately. The film when removed from the plate, was capable of being cold-drawn to a very strong flexible film, suitable for use in packaging or laminating.

Example III

A spinning solution was prepared, containing 30 percent of a polyethylene terephthalate polymer modified by inclusion of 30 percent of the same mixture of long chain aliphatic diesters as in Example I above, by heating a slurry of the ground polymer in a solvent consisting of 90 parts of phenol and 10 parts of water by weight at approximately 95° C. until solution was complete. The solution was then filtered through a sintered glass funnel and cooled to room temperature. The clear, pourable spinning solution was then extruded through a spinneret into a coagulating bath consisting of 50 percent N,N-dimethylformamide and 50 percent water by volume maintained at 50° C. The extruded stream was coagulated to a strong filament which could be cold-drawn after washing in a water bath at 90° C.

*Example IV*

A spinning solution containing 35 percent of the same modified polyethylene terephthalate polymer described in Example III above was prepared by heating a slurry of the ground polymer in a solvent consisting of 90 parts of phenol and 10 parts of water by weight at a temperature of approximately 90° C. After solution was complete the spinning solution was filtered and cooled to approximately 50° C. The solution was placed in a spinneret supply tube maintained at 50° C. and extruded into a coagulating bath of 50 parts of N,N-dimethylformamide and 10 parts of water by volume also maintained at 50° C. A strong filament was obtained which was collected on a take-up roll. The filament was capable of being drawn readily both before and after washing in a water bath at 90° C.

*Example V*

A spinning solution, containing 30 percent of a polyethylene terephthalate polymer modified by inclusion of 20 weight percent of the same mixture of long chain aliphatic diesters referred to in Example I above, was prepared by heating a slurry of the ground polymer in a solvent consisting of 90 parts of phenol and 10 parts of water by weight. The slurry was heated at approximately 95° C. until solution was complete, filtered, and cooled to approximately 50° C. Thereupon the clear, pourable spinning solution was placed in a spinning supply tube maintained at 50° C. and extruded into a coagulating bath of 50 parts of N,N-dimethylformamide and 10 parts of water by volume maintained at the latter temperature. A strong filament was collected on a take-up roll. The filament was washed in boiling water and thereafter cold-drawn to produce a very strong filament.

*Example VI*

A solution containing 20 percent by weight of polyethylene terephthalate was prepared by heating a slurry of the ground polymer in a solvent consisting of 90 parts of phenol and 10 parts water to a temperature of approximately 100° C. in the same manner as described above. The spinning solution was maintained at a temperature of approximately 70° C. in a reservoir consisting of a two-inch jacketed stainless steel pipe maintained at that temperature. The spinning solution was extruded by means of nitrogen gas at a pressure of approximately 18 pounds per square inch through a single hole spinneret of 0.0035 inch diameter into a coagulating bath of 50 parts of N,N-dimethylformamide and 10 parts of water by volume maintained at 50° C. The resulting filament could be cold drawn after washing in hot water.

*Example VII*

A spinning solution containing 25 percent of a polyethylene terephthalate polymer modified with 0.25 percent pentaerythritol and 18 percent methoxypolyethylene glycol having a molecular weight of 2,000, was prepared by mixing 15 grams of the polymer in the form of lathe turnings with 45 grams of a solvent consisting of 90 parts of phenol and 10 parts of water. The mixture was heated to approximately 130° C. in an oil bath with stirring until solution was complete. The spinning solution was then filtered through a sintered glass funnel, cooled to approximately 60° C. and placed in the solution supply tube of an apparatus similar to that described in Example VI above having a water jacket maintained at 60° C. Nitrogen gas pressure of about 16 pounds per square inch was applied to the spinning solution and a filament was extruded through a spinneret into a coagulating bath of 50 parts of N,N-dimethylformamide and 10 parts of water by volume at 50° C. The filament was coagulated by the bath and could be cold drawn after washing in hot water.

*Example VIII*

A 30 percent solution was prepared from a polyethylene terephthalate polymer modified by the inclusion of 10 percent of methoxypolyethylene glycol having an average molecular weight of 2,000 by mixing lathe turnings of the polymer and a solvent consisting of 90 parts phenol and 10 parts of water. The mixture was heated to approximately 130° C. in an oil bath and stirred to complete solution. After filtering and cooling the solution to approximately 60° C., it was maintained at this temperature in a jacketed vessel. The clear, pourable solution was flowed onto a glass plate at 60° C. and coagulated by immersing in a bath of N,N-dimethylformamide at room temperature. Coagulation was immediate to an opaque film, which upon washing and separating from the plate could be cold-drawn.

The process of the present invention makes possible the formation of a variety of shaped articles from polyesters by means of wet-spinning methods. In contrast to previous attempts to wet-spin these polymers, it is possible by the use of the instant invention to withdraw from the coagulation baths filaments and other shaped articles of good immediate strength which display superior tensile properties upon subsequent washing and cold drawing. Although the process of this invention has been illustrated as applicable to the formation of filaments, fibers, and films, the invention is not restricted thereto, since it is also useful for the formation of a variety of objects, such as surgical sutures, fishing leaders, fishing lines, dental floss, ribbons, tubes, sheets, bands, and the like.

The properties of the shaped articles formed by the process of this invention may be modified by appropriate modification of the spinning solutions. Thus, the spinning solutions may have incorporated therein various modifying agents, such as plasticizers, dyes, pigments, diluents, resins, cellulose derivatives, waxes, water repellents, luster modifying agents, flame repellents, and the like. The properties of the shaped articles may also be modified by the application thereto of any desired textile finish compositions, such as antistatic agents, lubricants, sizes, and the like. Moreover, the process of the present invention can be utilized to produce a finished textile yarn by employing continuous dyeing means after the removal of the residual solvent and coagulating liquid by washing. If desired, a finish can thereafter be applied to the filaments or yarns.

As many apparently widely different embodiments of this invention may be made without departing from the spirit and scope thereof, it is to be understood that the invention is not limited to the specific embodiments thereof except as defined in the appended claims.

We claim:

1. A process for forming shaped articles from a polyester polymer which comprises extruding a solution of a synthetic linear condensation polyester in a solvent therefor comprising a phenol in major proportion into a coagulating medium selected from the group consisting of N,N-dimethylformamide, N,N-dimethylacetamide, and mixtures thereof with water, and thereafter washing the shaped articles with water, said polyester comprising the reaction product of at least one dicarboxylic acid and at least one glycol of the series $HO(CH_2)_n$—$OH$, wherein $n$ is an integer from 2 to 10.

2. The process as defined in claim 1 wherein the said polyester is modified by a chain-terminator which is methoxypolyethylene glycol.

3. The process as defined in claim 1 wherein the said polyester is modified by a chain-terminator which is methoxypolyethylene glycol and a cross-linking agent which is trimethyl trimesate.

4. The process as defined in claim 1 wherein the said polyester is modified by a chain-terminator which is methoxypolyethylene glycol and a cross-linking agent which is pentaerythritol.

5. The process as defined in claim 1 wherein the said polyester contains in polymerized form a mixture of the dimethyl ester of eicosane-1,20-dioic acid and dimethyl ester of 8-ethyl octadecane-1,18-dioic acid.

6. The process as defined in claim 1 wherein the polyester is polyethylene terephthalate.

7. The process as defined in claim 1 wherein the solvent is a mixture of phenol and from 1 to 15 percent water.

8. The process as defined in claim 1 wherein the coagulating medium is N,N-dimethylformamide.

9. The process as defined in claim 1 wherein the coagulating medium is N,N-dimethylacetamide.

10. The process as defined in claim 1 wherein the coagulating medium is a mixture of N,N-dimethylformamide and water.

11. The process as defined in claim 1 wherein the coagulating medium is a mixture of N,N-dimethylacetamide and water.

12. A process for forming shaped articles from a polyester polymer which comprises extruding a solution containing from 20 to 40 percent by weight of a synthetic linear condensation polyester in a solvent therefor comprising a phenol in major proportion into a coagulating medium selected from the group consisting of N,N-dimethylformamide, N,N-dimethylacetamide, and mixtures thereof with water, maintained at a temperature of from about 5° C. to about 85° C., and thereafter washing the shaped articles with water, said polyester comprising the reaction product of at least one dicarboxylic acid and at least one glycol of the series $HO(CH_2)_n$—OH wherein $n$ is an integer from 2 to 10.

References Cited in the file of this patent
UNITED STATES PATENTS

| | | |
|---|---|---|
| 2,556,295 | Pace | June 12, 1951 |
| 2,577,763 | Hoxie | Dec. 11, 1951 |
| 2,597,643 | Izard | May 20, 1952 |

UNITED STATES PATENT OFFICE

CERTIFICATE OF CORRECTION

Patent No. 2,924,501                 February 9, 1960

William S. Wagner et al.

It is hereby certified that error appears in the printed specification of the above numbered patent requiring correction and that the said Letters Patent should read as corrected below.

Column 4, line 26, for "Serial No. 533,424" read -- Serial No. 553,424 --; line 27, for "Pat. No. 2,836,851" read -- Pat. No. 2,895,946 --.

Signed and sealed this 23rd day of August 1960.

(SEAL)
Attest:

KARL H. AXLINE
Attesting Officer

ROBERT C. WATSON
Commissioner of Patents